United States Patent

[11] 3,614,751

[72] Inventor Hiroshi Narisawa
Yokohama, Japan
[21] Appl. No. 858,987
[22] Filed Sept. 18, 1969
[45] Patented Oct. 19, 1971
[73] Assignee Hitachi, Ltd.
Tokyo, Japan
[32] Priority Sept. 20, 1968
[33] Japan
[31] 43/67603

[54] MEMORY CIRCUIT

8 Claims, 1 Drawing Fig.

[52] U.S. Cl. .......... 340/173 R, 333/29
[51] Int. Cl. .......... G11c 13/00
[50] Field of Search .......... 340/173 R, 173 RC; 333/29, 30

[56] References Cited

UNITED STATES PATENTS 3,274,566 9/1966 McGrogan .......... 340/173

*Primary Examiner*—Terrell W. Fears
*Attorney*—Craig, Antonelli and Hill

ABSTRACT: A memory circuit comprising counters of which the number of bits is equal to that of information, each one of the said counters corresponding to each address, and a single such counter common to all the addresses, wherein the said counters are advanced in synchronism with clock pulses, the counter corresponding to the address where information is to be written is set to a particular numerical representation at such a clock position that the contents of the write register and common counter are in conformity with each other, and the content of the common counter is read out at such a clock position that the address counters represent a particular number and is then transferred to a read-out register.

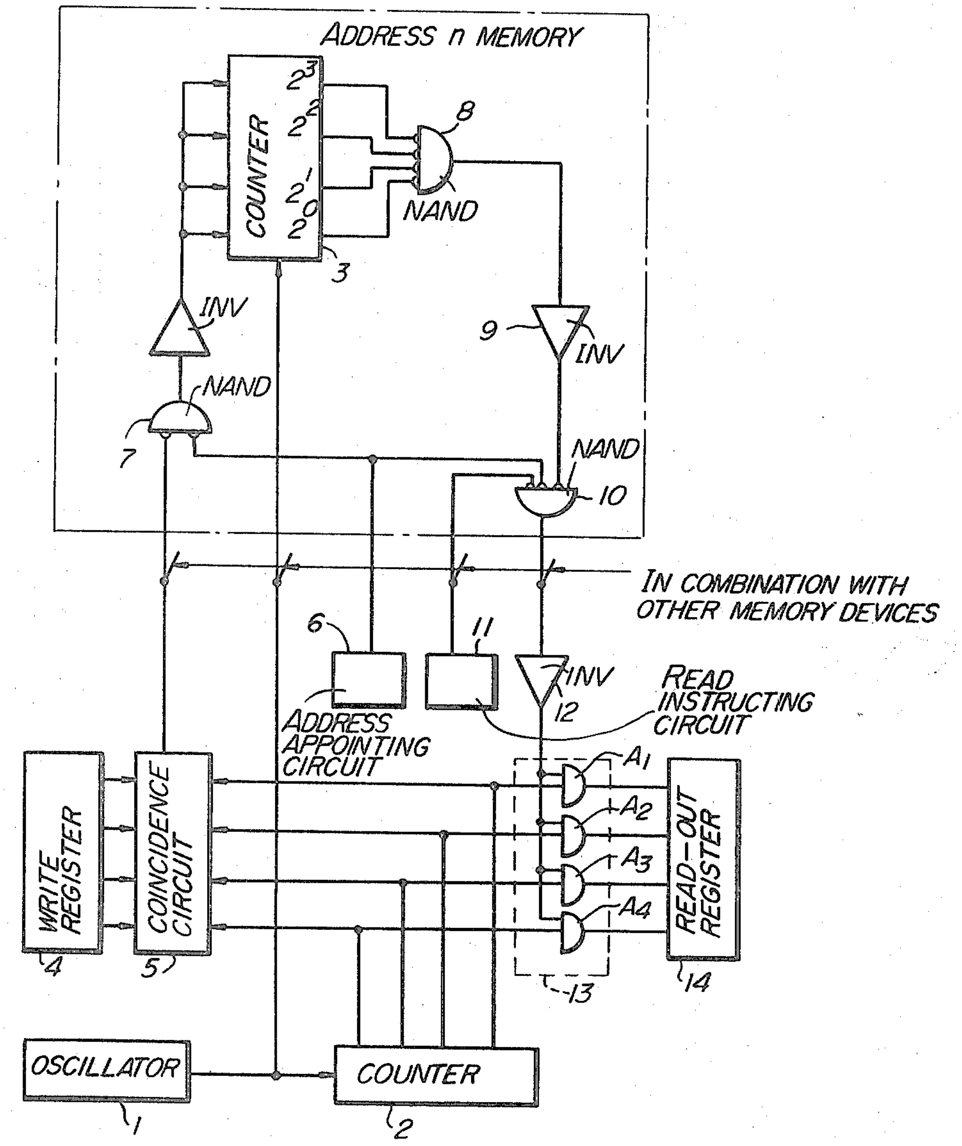
INVENTOR
HIROSHI NARISAWA
BY Craig, Antonelli, Stewart & Hill
ATTORNEYS

MEMORY CIRCUIT

BACKGROUND OF THE INVENTION

1. Field of the Invention

This invention relates to a memory device, and more particularly it pertains to a random-access type memory device where information consisting of plural bits is written in a plurality of addresses and read therefrom.

2. Description of the Prior Art

In the conventional memory device a memory register constituted by binary memory elements such as flip-flop circuits corresponding to the respective bits of information is provided at each address, and such information is stored by setting the memory register in accordance therewith. For example, in the case of a device adapted to store 4-bit information therein, memory registers each constituted by four flip-flops are provided at the respective addresses, written information set in a write register is transferred to the memory register corresponding to the said address through four transfer lines by appointing the address where the information is to be written, thereby writing the said information and maintaining the aforementioned condition. In an attempt read out the information stored at the said address, the content of the said register is provided to a read-out register by appointing the address.

The conventional device is so designed that information per se is written in each address or read therefrom as described above, and therefore it requires a considerable amount of hardware and complex operations for the purpose of permitting the exchange of information between the write register or read-out register and the memory register corresponding to each address.

SUMMARY OF THE INVENTION

Accordingly, it is an object of the present invention to provide a memory device adapted to writing, storing and reading information on the basis of novel principles.

Another object of the present invention is to provide a memory device having a simplified circuit arrangement.

Still another object of the present invention is to simplify the circuit arrangement and operation of such memory device by making the exchange of information between the memory device corresponding to each address and a control circuit all the same irrespective of the information and address.

The present invention is characterized in that there are provided counters of which the number of bits is equal to that of information, each one of said counters corresponding to each address, there is also provided single such counter common to all the addresses, said counters are advanced in synchronism with clock pulses, the counter corresponding to the address where information is to be written is set to a particular numerical representation at such a clock position that the contents of the write register and common counter are in conformity to each other, and the content of the common counter is read out at such a clock position that the address counters represent a particular number and is then transferred to a read-out register.

In other words, the present invention is characterized by memorizing the time phase corresponding to the information to be stored rather than storing the information per se at each address, and controlling the writing and reading of the information in accordance with said time phase.

Other objects, features and advantages of the present invention will become apparent from the following description taken in conjunction with the accompanying drawing.

BRIEF DESCRIPTION OF THE DRAWING

The accompanying drawing shows the memory circuit according to an embodiment of the present invention.

DESCRIPTION OF THE PREFERRED EMBODIMENT

Referring to the drawing, the portion enclosed by an alternate long and short dash line corresponds to a memory unit. There are provided a plurality of such memory units each of which has an address assigned thereto. In the drawing, only the memory unit corresponding to the address $n$ is shown.

An oscillator 1 always provides a clock pulse to a counter 2 and the memory devices corresponding to the entire addresses.

The counter 2, is a sexadecimal counter which is constituted by four binary counters connected in tandem and is adapted to effect one circulation at every 16 clock pulses supplied thereto by the oscillator 1.

The memory portion 3 provided in each of the memory units is a sexadecimal counter similar to the counter 2. Thus, information stored in each of the memory units is also circulated in synchronism with clock pulses supplied thereto by the oscillator 1.

Description will now be made of the writing operation with reference to the drawing. Assume now that information $m$ ($m<16$ ) is stored in the memory unit at the address $n$. In this case, the number $m$ is represented in four bits and admitted in a write register 4. The number $m$ or content of the write register is compared with the content of the counter 2 in accordance with the write instruction by the use of a coincidence circuit 5. This coincidence circuit 5 is adapted to compare the four-bit output of the counter and that of the write register. Such comparison can easily be achieved by effecting exclusive OR at every bit and coincidence between the respective bits. Whatever number may be admitted in the write register, there is a time when coincidence occurs once during one circulation of the counter. During the occurrence of the coincidence, a pulse output is taken from the output terminal of the coincidence circuit, and supplied to all the memory units. At this point, if the address $n$ is appointed by an address appointing circuit 6 which is separately provided, then a write gate (two-input NAND gate) 7 corresponding to the address $n$ is opened so that "1111" is set in the memory portion 3 is stored information at the address $n$. That is the respective bits $2^0$, $2^1$, $2^2$, $2^3$ of the content of the sexadecimal counter corresponding to the address $n$ are all set to 1 by the use of the direct select terminal of the sexadecimal counter. The memory portion 3 is made to effect one circulation in synchronism with the clock by 16 clock pulses and thus, if the content of the counter 2 is $m$ after the foregoing writing operation is over, then the information stored in the memory portion 3 corresponding to the address $n$ will always be "1111."

Description will now be made of the reading operation. Assume now that the number $m$ is stored in the memory portion 3 of the memory unit corresponding to the address $n$. The stored information (output) available from the memory portion 3 is supplied to a four-input NAND gate 8, which is adapted to be opened when the stored information becomes "1111." The output of the four-input NAND gate 8 is inverted by an inverter 9 so as to be supplied to a three-input NAND gate 3. The other inputs to the three-input NAND gate 10 are a read-out instruction available from a read-out instructing circuit 11 and address appointment from the address appointing circuit 6 respectively. If it is assumed that read-out instruction is provided, and that the address appointed is the address $n$, then the three-input NAND gate 10 is opened so that there is obtained a pulse output, which in turn is inverted by a read-out inverter 12 and then supplied to a read-out gate 13 constituted by four two-input NAND gates ($A_1$, $A_2$, $A_3$, $A_4$). Thus, the content of the counter 2 is transferred to a read-out register 14 through the read-out gate 13. As described above in connection with the writing operation, in case information stored in the memory portion 3 is $m$, then the content of the counter 2 when the stored information is "1111" will be $m$, and therefore $m$ will be transferred from the counter 2 to the read-out register 14.

The result will be that the information *m* stored in the memory portion 3 provided in the memory unit corresponding to the address *n* is transferred to the read-out register 17.

In the foregoing, the information writing and reading operations have been described. The memory resetting operation is a kind of writing operation, and therefore it can be effected by performing the writing operation, with "0000" set in the write register 4. Incidentally, the entire addresses can easily be reset all at once by effecting address appointment with respect to all the addresses.

Furthermore, confirmation as to whether the written content is correctly stored during the writing operation can be easily achieved by simultaneously providing read-out instruction during the writing operation and effecting "AND" between the output of the coincidence circuit 5 and the output of the read-out inverter 12.

In the aforementioned memory circuit of the present invention, a single common line (line connecting the three-input NAND gate (select gate) 10 and inverter 12 with each other) is used in the manner of time division for transferring written and read data. Thus, the control circuit can be economically constructed to a great advantage.

Although in the foregoing, the present invention has been described as applied to four-bit information, it can equally be applied to any information other than four-bit information.

I claim:

1. an information storage apparatus comprising:

first means for generating a plurality of pulses;

a first N-bit counter, responsive to the output of said first means, for counting the pulses generated by said first means;

a plurality of memory circuits, each having a second N-bit counter which is responsive to the output of said first means, for counting the pulses generated thereby in synchronism with said first N-bit counter;

second means, responsive to the output of said first N-bit counter, for setting one of said second N-bit counters, wherein information is to be stored, at a first predetermined count when the output of said first N-bit counter reaches a first preselected sum; and third means, for reading out the contents of one of said second N-bit counters in one of said memory circuits including means, responsive to a second predetermined count stored in said one of said second N-bit counters for transferring out the contents of said first N-bit counter.

2. An apparatus according to claim 1, further including a write register connected to said second means for supplying said first predetermined count to said first means and wherein said third means comprises a read-out register coupled to said transferring means and said first N-bit counter.

3. An apparatus according to claim 2, wherein each of said memory circuits further includes a first logic circuit responsive to the output of said second means and a signal representative of the address of that particular memory circuit for delivering a predetermined count set signal to the second N-bit counter within said memory.

4. An apparatus according to claim 2, wherein each memory circuit includes a second logic circuit responsive to the storage of said second predetermined count in the second N-bit counter therein for providing an output signal upon the storage of said second predetermined count and a third logic circuit, responsive to a signal representative of the address of that particular memory circuit, the read-out signal, the output of said second logic circuit, for enabling said transferring means to read out the contents of said first N-bit counter.

5. An apparatus according to claim 3, wherein each memory circuit includes a second logic circuit, responsive to the storage of said second predetermined count in the second N-bit counter therein for providing an output signal upon the storage of said second predetermined count and a third logic circuit responsive to a signal representative of the address of that particular memory circuit, a read-out signal and the output of said second logic circuit, for enabling said transferring means to read out the contents of said first N-bit counter.

6. An apparatus according to claim 5, wherein said transferring means comprises an N-plurality of AND gates each of which is coupled to the output of said third logic circuit and are respectively connected to the outputs of said first N-bit counter, the outputs of said AND gates being respectively connected to said read-out register.

7. An apparatus according to claim 6, wherein each of said first, second and third logic circuits comprises a NAND gate, the outputs of which are respectively connected through inverter circuits for inverting the outputs thereof.

8. An apparatus according to claim 4, wherein said first and second predetermined counts are the same.